(12) United States Patent
Tseng et al.

(10) Patent No.: US 11,517,895 B2
(45) Date of Patent: Dec. 6, 2022

(54) LIQUID AMOUNT CONTROL DEVICE AND LIQUID AMOUNT CONTROL METHOD THEREOF

(71) Applicant: INVENTEC APPLIANCES CORP., New Taipei (TW)

(72) Inventors: Wen-Tso Tseng, New Taipei (TW); Yen-Chieh Chang, New Taipei (TW); Wen-Hsiang Tu, New Taipei (TW)

(73) Assignees: INVENTEC EASY DOCTOR CORPORATION, Shanghai (CN); INVENTEC APPLIANCES (PUDONG) CORPORATION, Shanghai (CN); INVENTEC APPLIANCES (SHANGHAI) CO., LTD., Shanghai (CN); INVENTEC APPLIANCES CORP., New Taipei (TW)

( * ) Notice: Subject to any disclaimer, the term of this patent is extended or adjusted under 35 U.S.C. 154(b) by 357 days.

(21) Appl. No.: 16/907,399

(22) Filed: Jun. 22, 2020

(65) Prior Publication Data

US 2021/0069693 A1 Mar. 11, 2021

(30) Foreign Application Priority Data

Sep. 9, 2019 (CN) .......................... 201910847275.1

(51) Int. Cl.
*B01L 3/02* (2006.01)
*G06T 7/00* (2017.01)

(52) U.S. Cl.
CPC .......... *B01L 3/0237* (2013.01); *G06T 7/0002* (2013.01); *B01L 2200/14* (2013.01); *B01L 2400/0487* (2013.01)

(58) Field of Classification Search
CPC .............. B01L 3/0237; B01L 2200/14; B01L 2400/0487; G06T 7/0002; G01F 25/20; G01N 35/1016; F04B 13/00; F04B 49/06; F04B 51/00; F04B 53/00
USPC ............. 73/864.01, 1.79, 1.73, 1.74, 864.11, 73/864.24, 864.25; 422/501, 509, 422/516–519; 348/135; 702/94, 95, 100
See application file for complete search history.

(56) References Cited

U.S. PATENT DOCUMENTS 5,463,895 A * 11/1995 Brentz ............... G01N 35/1016
73/61.71

FOREIGN PATENT DOCUMENTS

DE 102011006581 * 10/2021
WO 2019133424 * 7/2019

* cited by examiner

*Primary Examiner* — Robert R Raevis
(74) *Attorney, Agent, or Firm* — McClure, Qualey & Rodack, LLP

(57) ABSTRACT

A liquid amount control device includes a position detector, a pump, a driver and a controller. The pump is connected with a first tip and configured to suck up the liquid out of the test tube. The driver is connected with the pump and configured to drive the pump to move. The controller is configured to: (1) control the driver to drive a first suction end of the first tip to enter a detection region of the position detector to obtain an end height position of the first suction end; (2) control the driver to drive the first suction end of the first tip to enter the liquid by a first entering depth according to the end height position; and (3) control the pump to suck up the liquid in the test tube through the first tip.

20 Claims, 14 Drawing Sheets

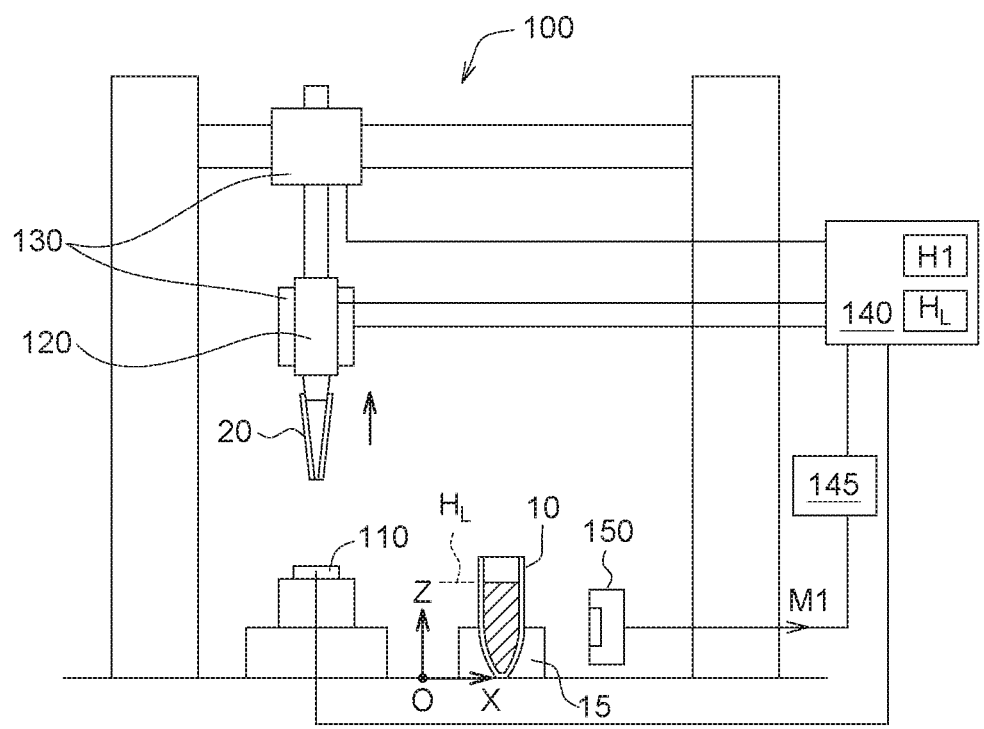
FIG. 2C1
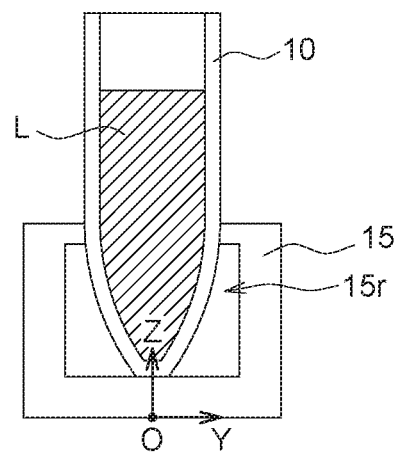
FIG. 2C2

LIQUID AMOUNT CONTROL DEVICE AND LIQUID AMOUNT CONTROL METHOD THEREOF

This application claims the benefit of People's Republic of China application Serial No. 201910847275.1, filed Sep. 9, 2019, the subject matter of which is incorporated herein by reference.

BACKGROUND OF THE INVENTION

Field of the Invention

The present disclosure relates to a control device and a control method thereof, and more particularly to a liquid amount control device and a liquid amount control method thereof.

Description of the Related Art

The conventional liquid amount control device could repeatedly suck up the liquid in the test tube, and finally control the remaining liquid amount in the test tube to a target preset amount. However, it is difficult to accurately control the suction amount, and thus it often results in a large difference between the remaining liquid amount in the test tube and the target preset amount. Therefore, there is a need to propose a liquid amount control device and a liquid amount control method using the same capable of reducing the difference between the remaining liquid amount in a test tube and the target preset amount.

SUMMARY OF THE INVENTION

The invention is directed to a liquid amount control device and a liquid amount control method thereof capable of resolving the above-mentioned problems encountered in the prior art.

According to an embodiment of the present invention, a liquid amount control device for controlling liquid amount of liquid in a test tube is provided. The liquid amount control device comprises a position detector, a pump, a driver, and a controller. The pump is connected with a first tip and configured to suck up the liquid out of the test tube. The driver is connected with the pump and configured to drive the pump to move. The controller is electrically connected to the position detector, the driver and the pump, and the controller is configured to control the driver to drive a first suction end of the first tip to enter a detection region of the position detector to obtain an end height position of the first suction end; control the driver to drive the first suction end of the first tip to enter the liquid by a first entering depth according to the end height position; and control the pump to suck up the liquid in the test tube through the first tip.

According to another embodiment of the present invention, a liquid amount control method for controlling liquid amount of liquid in a test tube is provided. The liquid amount control method includes the following steps: providing the liquid amount control device as disclosed above; controlling, by the controller, the driver to drive the first suction end of the first tip to enter the detection region of the position detector to obtain an end height position of the first suction end; controlling, by the controller, the driver to drive the first suction end of the first tip to enter the liquid by the first entering depth according to the end height position; and controlling, by the controller, the pump to suck up the liquid in the test tube through the first tip.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIG. 1 shows a functional block diagram of the liquid amount control device 100 according to an embodiment of the present invention, and FIGS. 2A to 2O show processes of the liquid amount control method of the liquid amount control device 100 of FIG. 1, and FIGS. 3A to 3B show a flowchart of the liquid amount control method of the liquid amount control device 100 in FIG. 2A.

The liquid amount control device 100 is configured to control the liquid amount of the liquid L in the test tube 10. The test tube 10 could be disposed on a carrier 15 (the carrier 15 is shown in FIG. 2C2). For example, the liquid amount control device 100 could repeatedly suck up the liquid L in the test tube 10 so that the final remaining liquid amount in the test tube 10 is accurately controlled at the target preset amount. The liquid amount control device 100 in the present embodiment of the present invention could be applied to the medical field or the field of precision automatic dispensing. In the medical field, the liquid L in the test tube 10 is, for example, an injection solution injected into a living body. Since the final remaining liquid amount in the test tube 10 is accurately controlled at the target preset amount, more accurate therapy or medical experiments could be performed. In the field of precision automated dispensing, the liquid L in the test tube 10 is, for example, adhesive. Since the final remaining liquid amount in the test tube 10 could be precisely controlled at the target preset amount, more precise dispensing could be performed to avoid problems of overflowing or insufficient adhesive amount.

Figure 1:
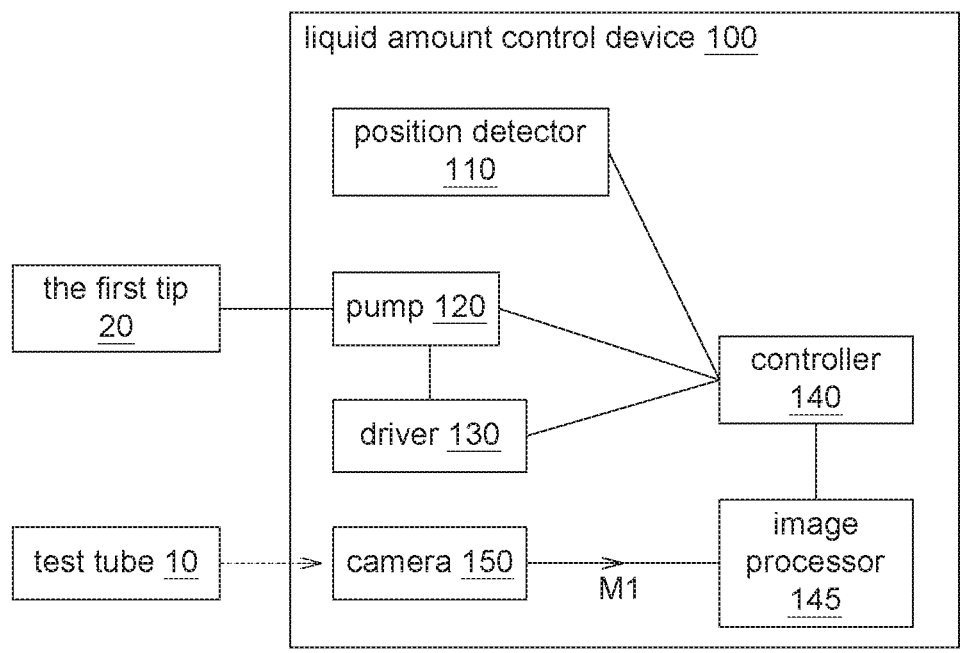
Referring to FIGS. 1, 2A to 2O and 3A to 3B.
Figure 2A:
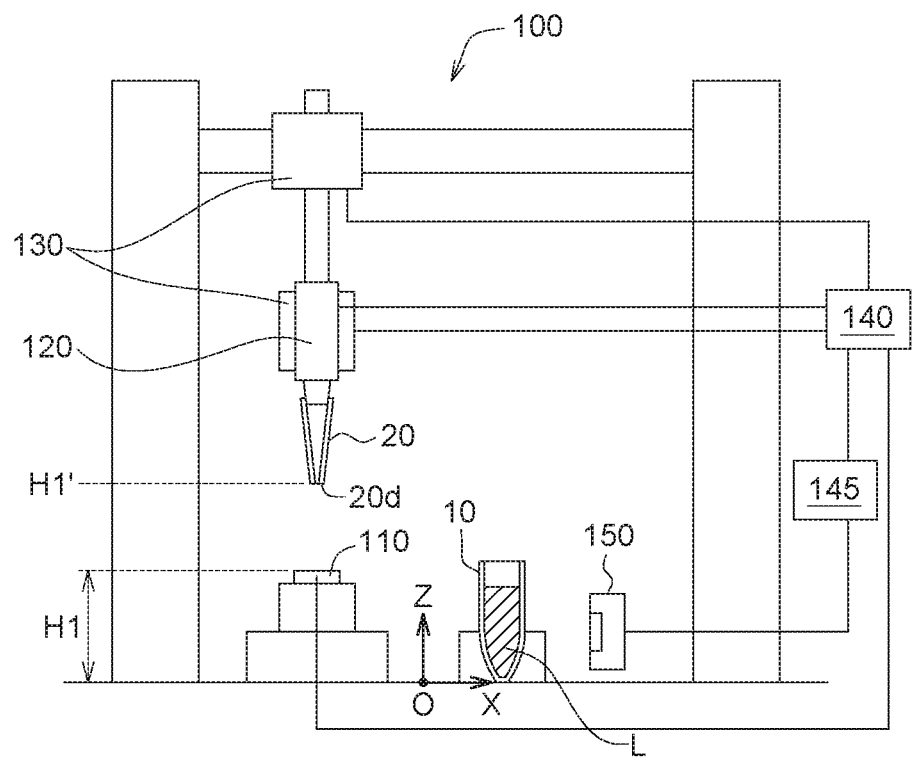

As shown in FIGS. 1 and 2A, the liquid amount control device 100 includes a position detector 110, a pump 120, a driver 130, a controller 140, an image processor 145 and a camera 150. The controller 140 and the image processor 145 could be a circuit structure formed by a semiconductor process. In an embodiment, the controller 140 and the image processor 145 could be two individual components which are made separately, but may also be integrated into a single component.

Figure 2B:
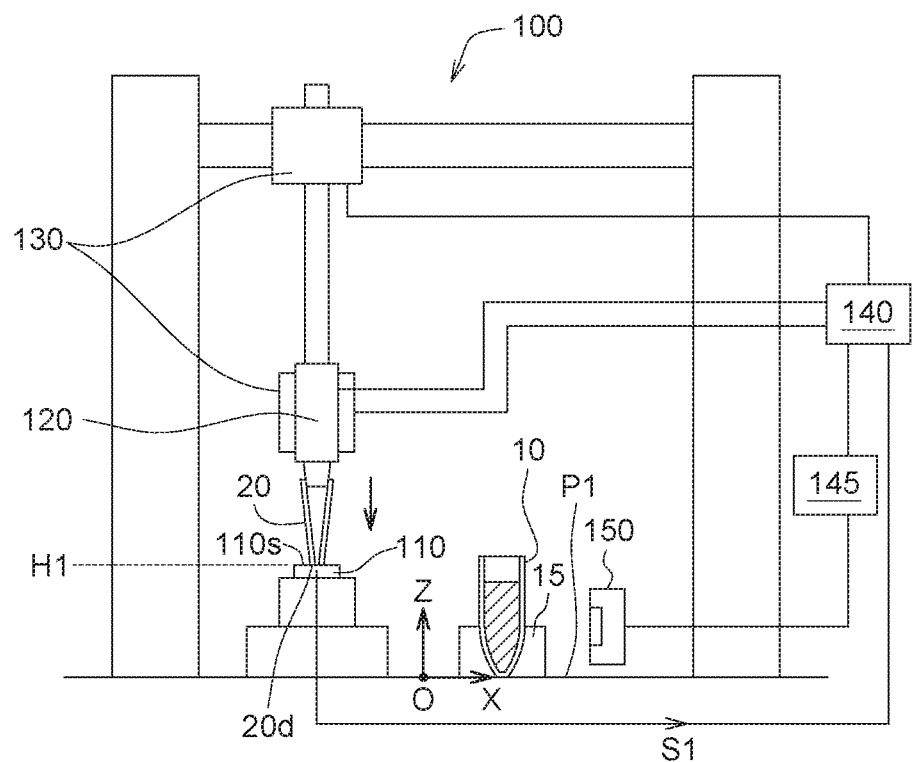

As shown in FIGS. 1 and 2A, the position detector 110 is configured to detect an end height position H1 of a first suction end 20d of the first tip 20 (the end height position H1 is shown in FIG. 2B). The pump 120 is configured to connect the first tip 20 to suck up the liquid L out of the test tube 10. The driver 130 is connected to the pump 120 to drive the pump 120 to move. The controller 140 is electrically connected to the position detector 110, the driver 130 and the pump 120, and is configured to: (1). control the driver 130 to drive the first suction end 20d of the first tip 20 to enter the detection region of the position detector 110 for obtaining the end height position H1 of the first suction end 20d; (2). control the control driver 130 to drive the first tip 20 to enter the liquid L in a first entering depth h1 (the first entering depth h1 is shown in FIG. 2E) according to the end height position H1; and (3). control the pump 120 to suck up the liquid L in the test tube 10 through the first tip 20.

Figure 3A:
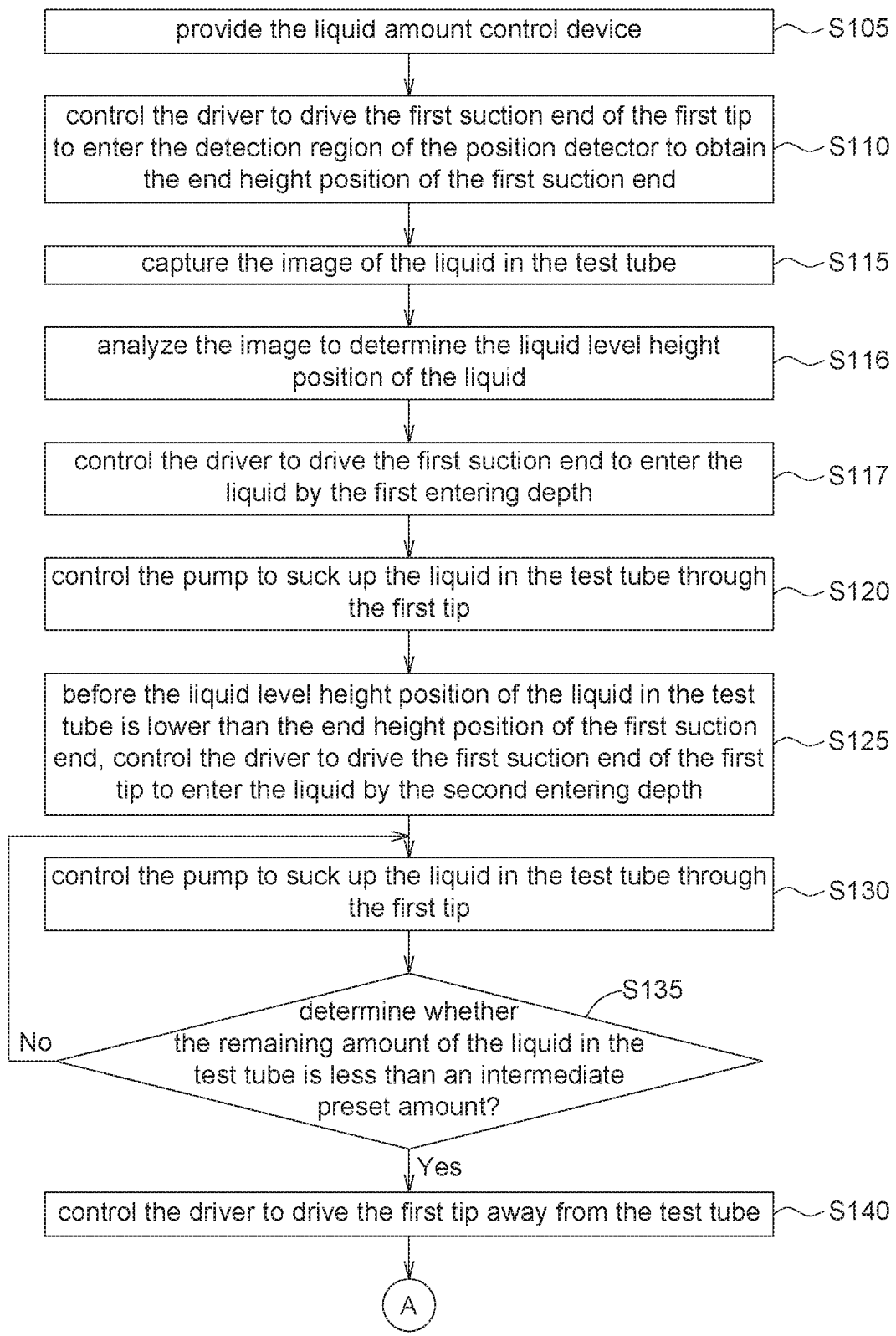
Figure 3B:
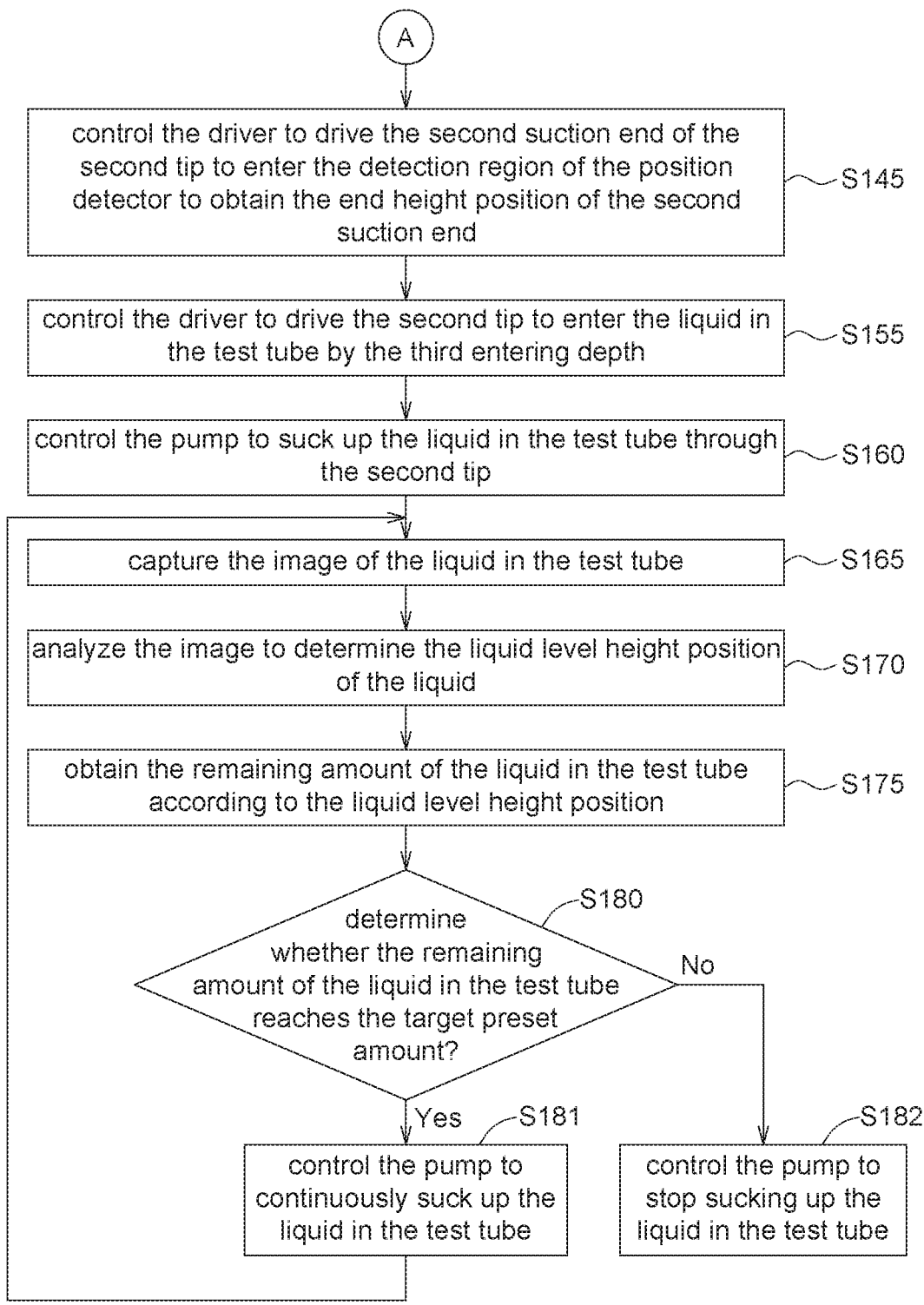

The example is described using the process flow diagram of the liquid amount control method of FIGS. 2A to 2O and the flowchart of FIG. 3.

In step S105, the liquid amount control device 100 as shown in FIG. 2A is provided. In figure, X direction is, for example, a horizontal direction, and Z direction is, for example, a vertical direction. The controller 140 could control the driver 130 to move in X direction and/or the Z direction, so as to drive the first tip 20 connected to the driver 130 to move in the X direction and/or the Z direction.

In step S110, as shown in FIG. 2B, the controller 140 controls the driver 130 to drive the first suction end 20d of the first tip 20 to enter the detection region of the position detector 110 to obtain the end height position H1 of the first suction end 20d.

In the present embodiment, the position detector 110 is, for example, a contact-type detector, such as a limit switch. The detection region of the position detector 110 is, for example, a detection surface 110s of the position detector 110 (shown in FIG. 2B). The detection accuracy of the position detector 110 is, for example, 1 micrometer, but it could also be larger or even smaller, so that the accuracy of the measured end height position H1 is high. As a result, it is conducive to accurately controlling a depth in which the tip to enter. In another embodiment, the position detector 110 could also be a non-contact type detector, for example, an optical detector.

The position of the detection region of the position detector 110 is the end height position H1. In an embodiment, the controller 140 knows the height relationship between the coordinates of the detection region of the position detector 110 and the coordinates of the origin O, for example, the relative height in the Z direction. For example, the coordinates of the origin O could be set to (0, 0, 0), and the coordinates of the detection region of the position detector 110 could be set to (x, y, H1), wherein the values of x and y depend on the position of the position of the detector 110. The controller 140 obtains the end height position H1 according to the difference between a Z component value of the coordinates of the detection region of the position detector 110 and the coordinates of the origin O. In the present disclosure, the position of the origin O is not limited. For example, the origin O could be located on a reference plane P1 (shown in FIG. 2B) carrying the carrier 15. As shown in FIG. 2B, the reference plane P1 could be a horizontal plane, and the test tube 10, the position detector 110 and the camera 150 could be located above the reference plane P1.

As shown in FIG. 2B, when the first suction end 20d touches the detection surface 110s of the position detector 110, the position detector 110 sends a touch signal S1 to the controller 140, and the controller 140 could define the position of the first suction end 20d touching the position detector 110 as a known end height position H1 after the controller 140 receives the touch signal S1. After defining the end height position H1 of the first suction end 20d, the controller 140 could obtain the position of the moved (current) first suction end 20d according to the movement amount of the first suction end 20d in the X direction and/or Z direction. The driver 130 includes, for example, at least a stepping motor (not shown), which could accurately control the movement amount of the first suction end 20d in the X direction and/or Z direction, so that the controller 140 could control the driver 130 to control the first suction end 20d precisely move to the desired position, for example, a depth position of entering liquid L in the test tube 10. In an embodiment, the movement accuracy of the driver 130 drives the first suction end 20d could be controlled to be ±0.03 millimeters (mm), but it could be larger or even smaller.

In step S115, as shown in FIGS. 2C1 and 2C2, the camera 150 captures an image M1 of the liquid L in the test tube 10. As shown in FIG. 2C2, the test tube 10 is disposed on the carrier 15, the carrier 15 has a hollow portion 15r, and the liquid L in the test tube 10 is exposed from the hollow portion 15r, so that the camera 150 could capture the image M1 including a liquid level of the liquid L. In one embodiment, the camera 150 is, for example, a microscope image camera, which could capture a finer (higher resolution) image M1 of the liquid L in the test tube 10.

In step S116, the image processor 145 analyzes the image M1 to determine a liquid level height position $H_L$ of the liquid L, wherein the liquid level height position HL is, for example, the height position (in the Z direction) of the liquid level with respect to the origin O.

Figure 2D:
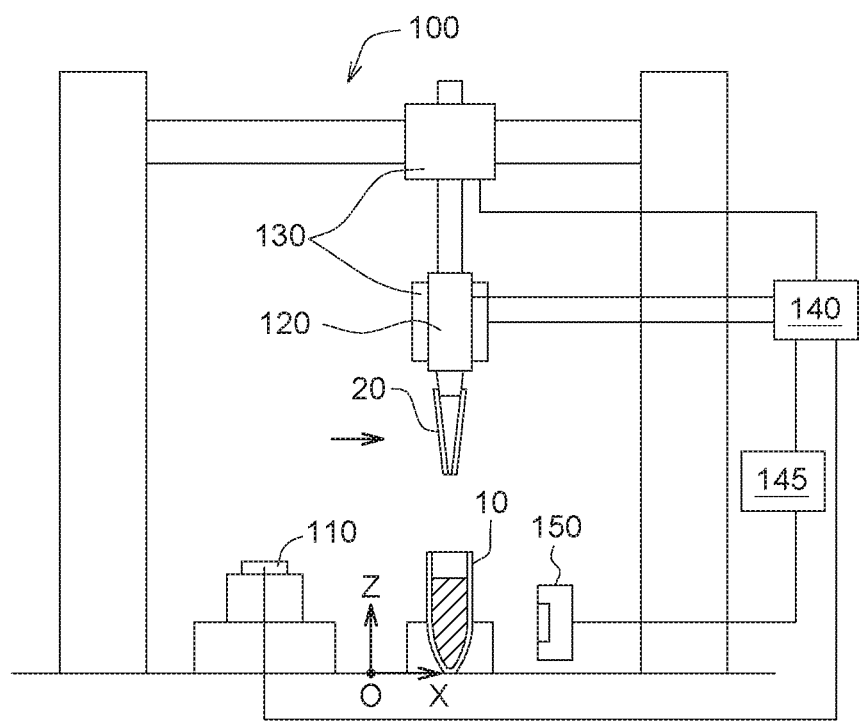
Figure 2E:
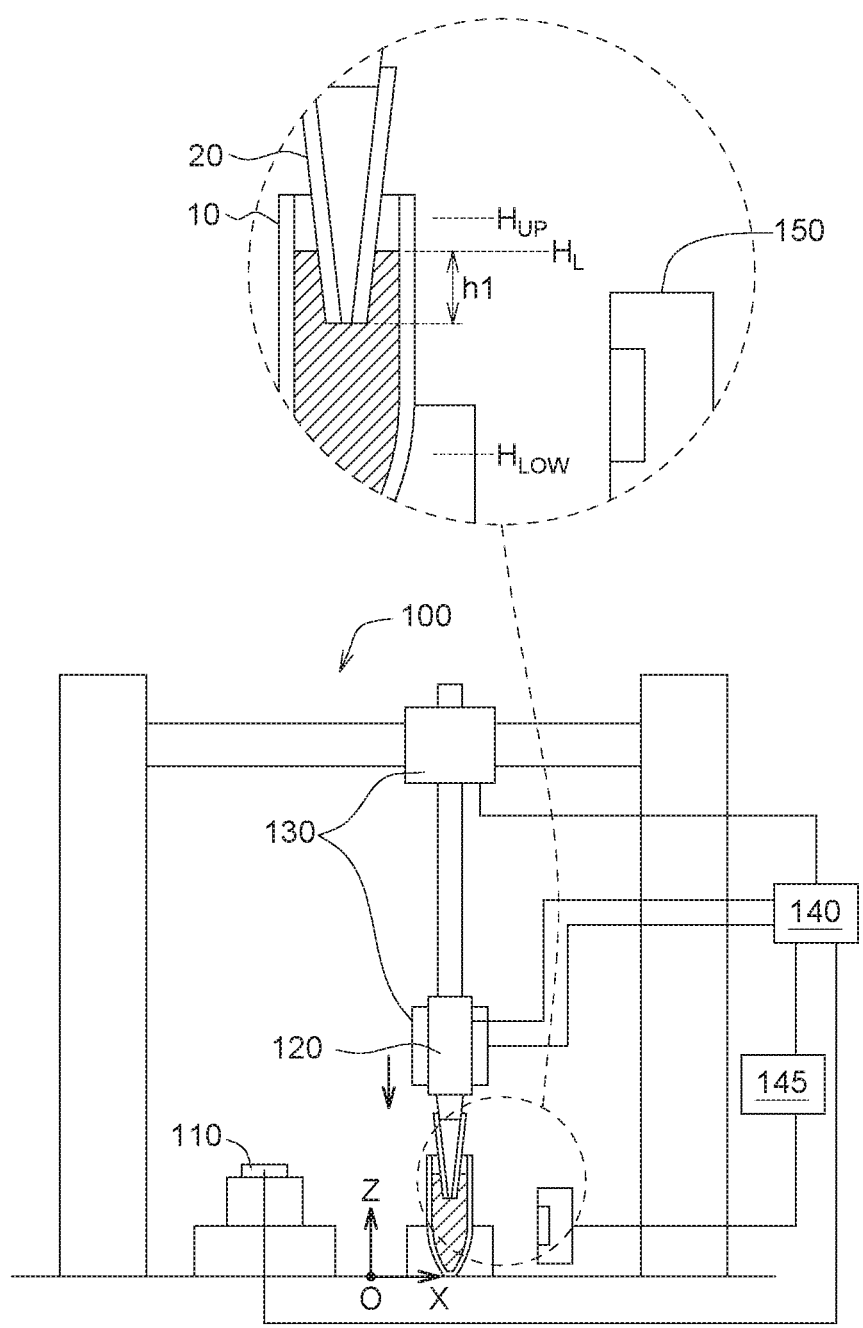

Then, as shown in FIG. 2D, the controller 140 controls the driver 130 to drive the first tip 20 to move directly above the test tube 10 in the X direction.

In step S117, as shown in FIG. 2E, the controller 140 controls the driver 130 to drive the first suction end 20d to enter the liquid L by the first entering depth h1 in the −Z direction according to the liquid level height position $H_L$ and the end height position H1. The first entering depth h1 is, for example, a depth downward extending from the liquid level height position $H_L$ in the −Z direction.

The first entering depth h1 is, for example, a preset value. In an embodiment, the first entering depth h1 is, for example, between 1 mm and 3 mm. Such a depth could avoid excessive liquid L remaining on an outer wall surface and/or an inner wall surface of the first tip 20. Furthermore, if the first entering depth h1 is too deep, after the first tip 20 leaves the liquid level upward, the liquid L remaining on the wall surface of the first tip 20 may flow down (called "sagging") into the test tube 10. Because the sagging is difficult to estimate, the remaining liquid amount L in the test tube 10 is possible to changes unexpectedly. In another embodiment, the amount of the liquid L absorbed by the first tip 20 each time may be limited to a range between 10% to 20% of the remaining amount of the liquid L in the test tube 10, and the problem of the sagging similar to the foregoing could also be avoided.

As shown in FIG. 2E, the range of the first entering depth h1 could range between an upper limit position $H_{UP}$ and the lower limit position $H_{LOW}$, and the region between the upper limit position $H_{UP}$ and the lower limit position $H_{LOW}$ is the photographable area for the camera 150. In addition, the upper limit position $H_{UP}$ and the lower limit position $H_{LOW}$ may be described as heights with respect to the origin O.

Figure 2F:
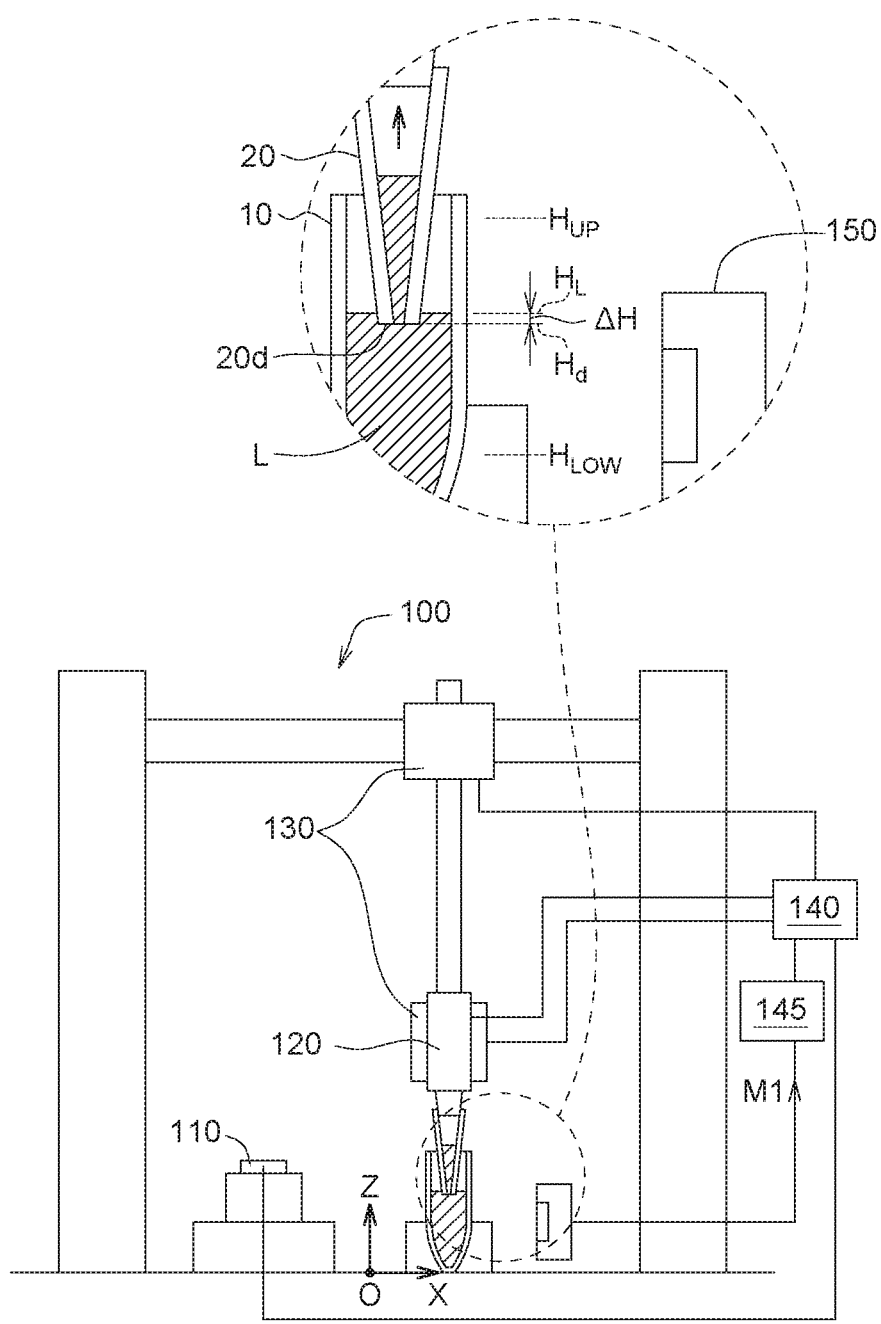

In step S120, as shown in FIG. 2F, the controller 140 controls the pump 120 to suck up the liquid L in the test tube 10 through the first tip 20. The liquid L sucked up by the first tip 20 could be guided to a liquid storage tank (not shown) outside the first tip 20 through the suction of the pump 120.

Figure 2G:
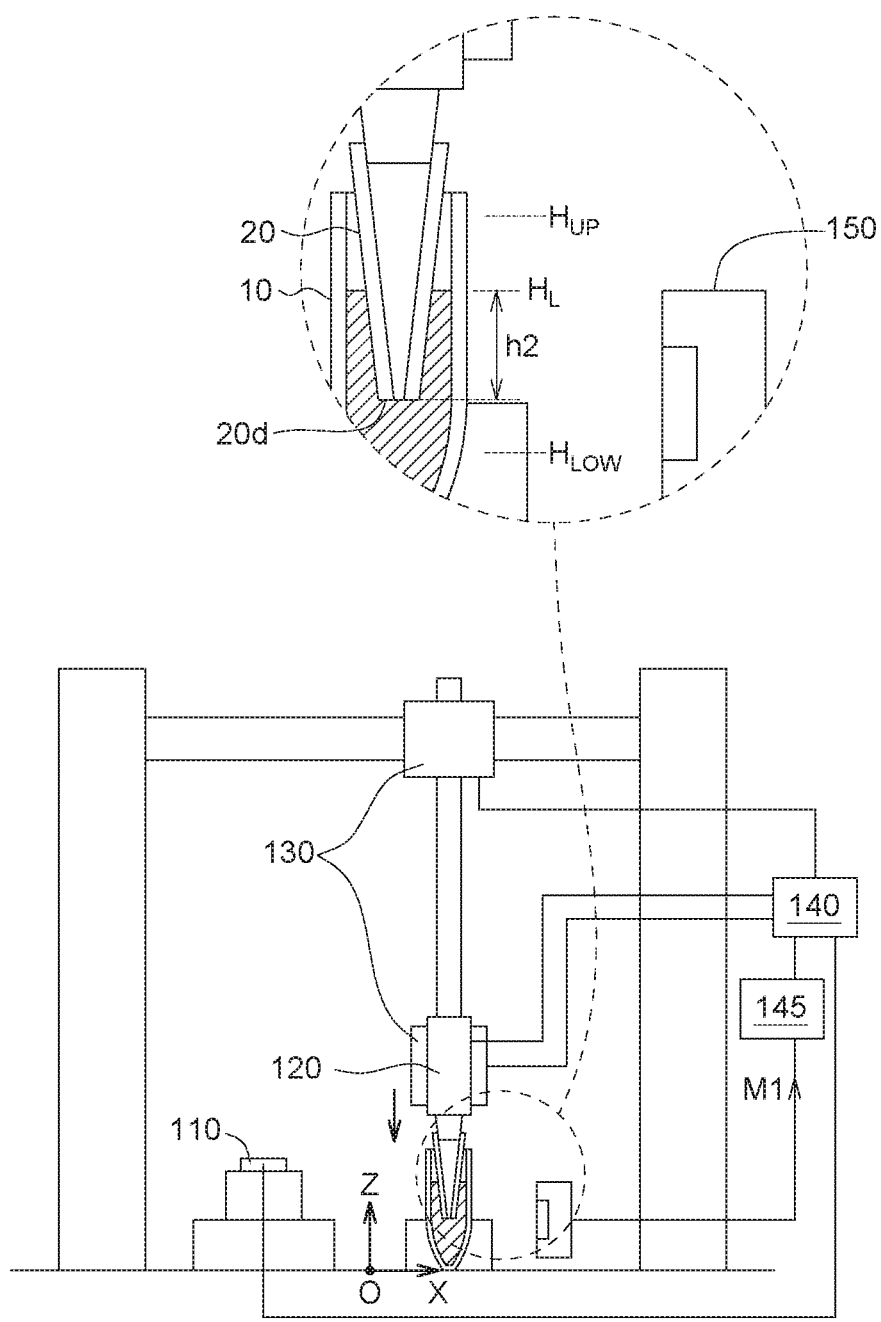

In step S125, as shown in FIG. 2G, during the suction process, before the liquid level height position $H_L$ of the liquid L in the test tube 10 is lower than the end height position $H_d$ of the first suction end 20d, the controller 140 could control the driver 130 to drive the first suction end 20d of the first tip 20 to enter the liquid L toward −Z direction for (as shown in FIG. 2G) by a second entering depth h2. As a result, empty suction of the first suction end 20d could be avoided (if the liquid level height position $H_L$ is lower than the end height position $H_d$ of the first suction end 20d, the first suction end 20d will suck up air). In addition, the above-mentioned end height position $H_d$ is described as the height with respect to the origin O. During the process that the first suction end 20d extending downward to enter the liquid L by a depth, the first suction end 20*d* could continuously suck up the liquid L in the test tube 10 without stopping. In addition, the second entering depth h2 could be calculated from the liquid level of the liquid L in the test tube 10. In an embodiment, the second entering depth h2 and the aforementioned first entering depth h1 could be the same, but could be different. The range of the second entering depth h2 ranges between the upper limit position $H_{UP}$ and the lower limit position $H_LOW$, and the range between the upper limit position $H_{UP}$ to the lower limit position $H_{LOW}$ is the photographable area for the camera 150.

Figure 2H:
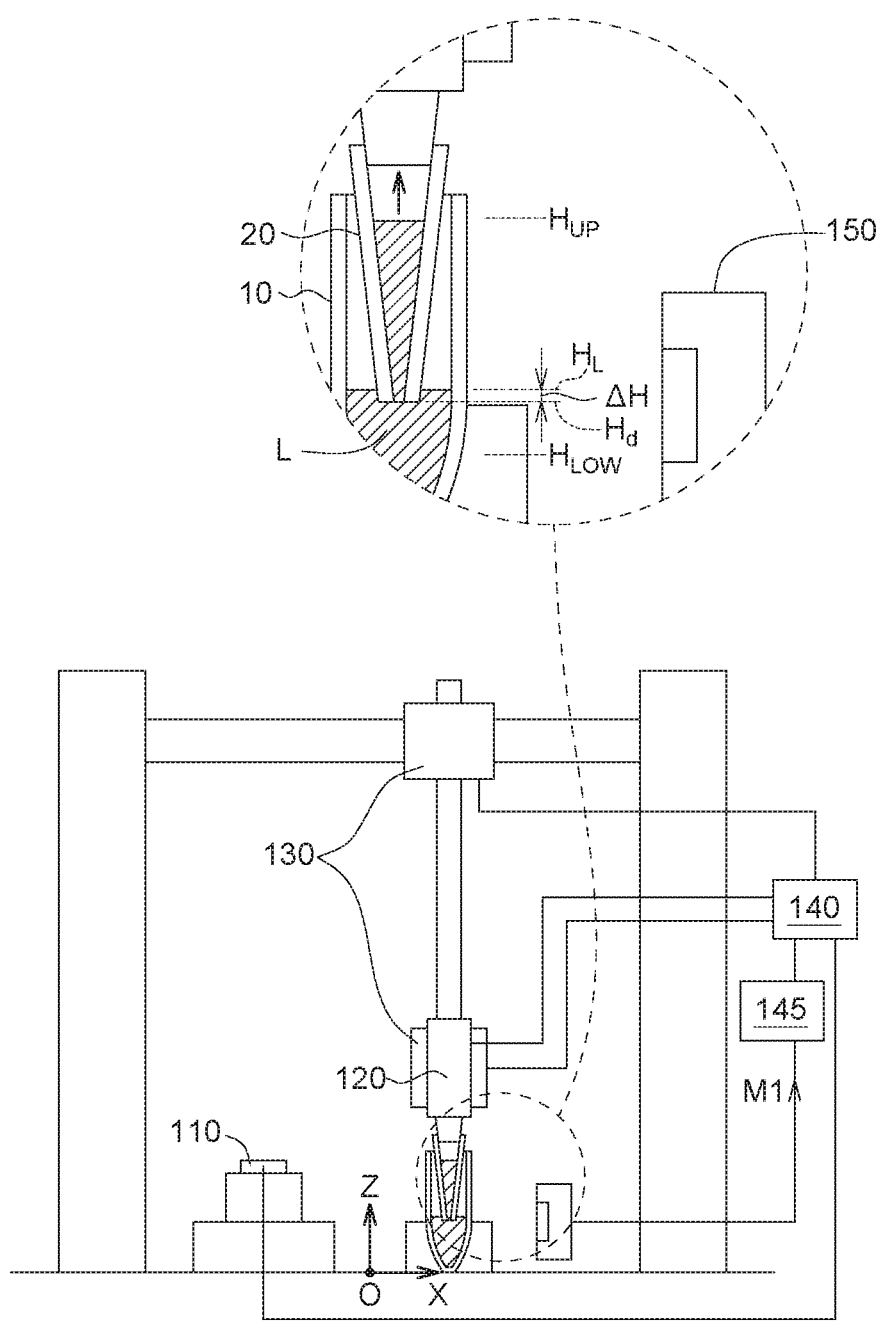

In step S130, as shown in FIG. 2H, the controller 140 controls the pump 120 to suck up the liquid L in the test tube 10 through the first tip 20.

In an embodiment, during the suction process, the image processor 145 could analyze the image M1 captured by the camera 150 to obtain the current liquid level height position $H_L$ and the end height position $H_d$, and then determine whether the height difference ΔH between the liquid level height position $H_L$ and the end height position $H_d$ of the first suction end 20*d* has reached a preset difference. If so, the controller 140 controls the driver 130 to drive the first suction end 20*d* to downward enter the liquid L and at the same time controls the pump 120 to continue to suck up the liquid L in the test tube 10 through the first tip 20; if not, the controller 140 controls the pump 120 to continue to suck up the liquid L, maintaining the position of the first suction end 20*d*, the liquid L in the test tube 10 through the first tip 20. In addition, the preset difference is, for example, between 1 microliter and 3 milliliters, but it could also be larger or smaller. The embodiment of the present invention does not limit the actual value of the aforementioned preset difference.

In step S135, the image processor 145 determines whether the remaining amount of the liquid L in the test tube 10 is less than an intermediate preset amount. For example, the controller 140 could control the driver 130 to drive the first tip 20 to leave the liquid L in the test tube 10 first. Then, the image processor 145 analyzes the image M1 captured by the camera 150 to determine the liquid level height position $H_L$ of the liquid L in the test tube 10, and then obtains the remaining amount of the liquid L based on the liquid level height position $H_L$, and then determines whether the remaining amount reach the target preset amount. The way for the image processor 145 obtaining the remaining amount of the liquid L in the test tube 10 is, for example, to obtain the remaining amount of the liquid L corresponding to the current liquid level height position $H_L$ according to a relative relationship between the remaining amount and the liquid level height position (for example, an equation or a table) and a mathematical method (for example, an interpolation method). The intermediate preset amount is, for example, between 50 microliters and 100 microliters.

When the remaining amount of the liquid L in the test tube 10 is not less than the intermediate preset amount ("No" in step S135), the process returns to step S130, and the controller 140 could: (1). continue to control the pump 120 suck up the liquid L in the test tube 10 through the first tip 20; or (2). control the driver 130 to drive the first tip 20 to continuously enter the liquid L by an appropriate depth (when the height difference ΔH between the liquid level height position $H_L$ and the end height position $H_d$ of the first suction end 20*d* has reached the aforementioned preset difference), then the pump 120 is controlled to continue to suck up the liquid L in the test tube 10 through the first tip 20.

Before the remaining amount of the liquid L in the test tube 10 is less than the intermediate preset amount ("Yes" in step S135), depending on the initial amount of the liquid L in the test tube 10 (before the first suction, as shown in FIG. 2A) and the sucking amount sucked by the first tip 20 each time, the controller 140 could control the first tip 20 to enter the liquid L in the test tube 10 once, twice or more times. In addition, in an embodiment, the first tip 20 could perform only one-time suction. Furthermore, after the first tip 20 enter the liquid L by the first entering depth h1 for the first time, first tip 20 could directly suck up the liquid L in the test tube 10 until the first tip 20 suck up air or a preset amount of the liquid L is sucked. Then, the process proceeds to step S140, and the micro-suction step starts. In addition, if the controller 140 knows the liquid level height position of the liquid L in the test tube 10 before the first tip 20 enters the liquid L, the process could omit the image processing steps of steps S115 and S116.

When the remaining amount of the liquid L in the test tube 10 is less than the intermediate preset amount ("YES" in step S135), the process proceeds to step S140.

Figure 2I:
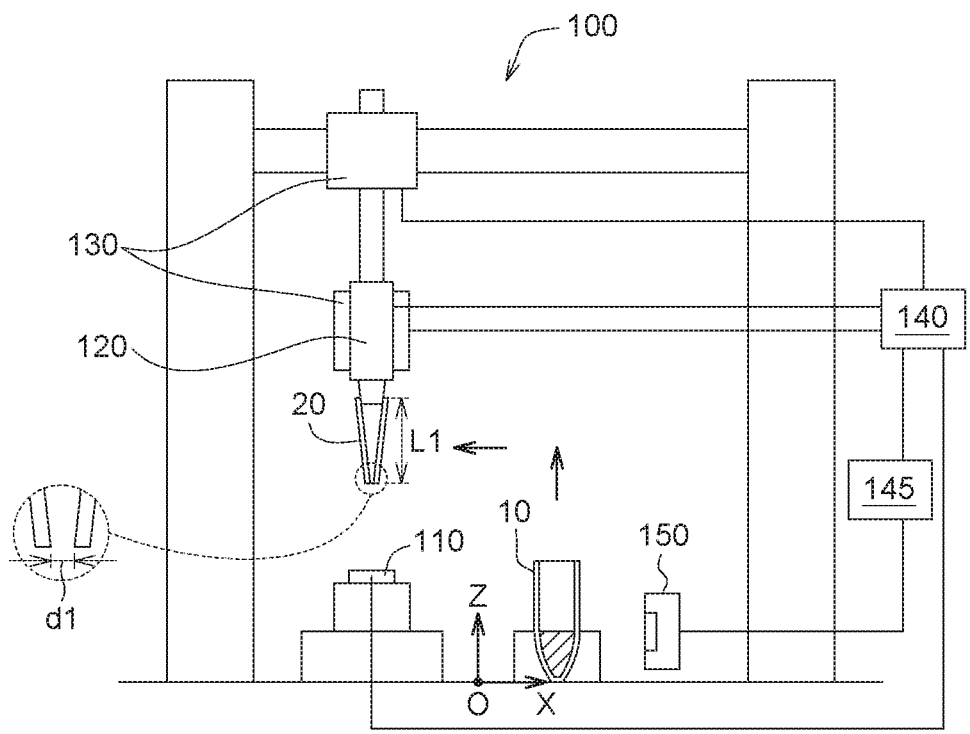
Figure 2J:
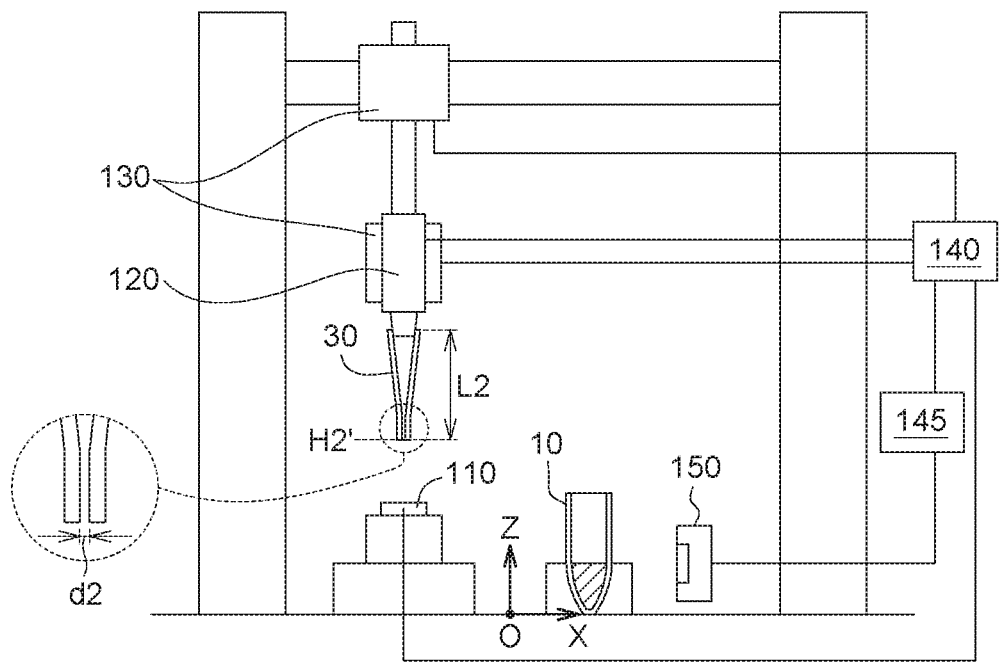

In step S140, as shown in FIG. 2J, the controller 140 controls the driver 130 to drive the first tip 20 away from (leaves) the test tube 10. For example, the controller 140 controls the driver 130 to drive the first tip 20 to move in the +Z direction to completely leave the test tube 10, and drives the first tip 20 to move in the −X direction until the first tip 20 is located right above the position detector 110.

Then, as shown in FIG. 2J, the user could replace the first tip 20 shown in FIG. 2I with a second tip 30. A pipe diameter d2 of the second tip 30 and a pipe diameter d1 of the first tip 20 (the pipe diameter d1 is shown in FIG. 2I) could be different. In the present embodiment, the pipe diameter d2 of the second tip 30 is smaller than the pipe diameter d1 of the first tip 20 to suck up the liquid L in the test tube 10 in a small amount, so that the final remaining amount of the liquid L in the test tube 10 could be controlled more accurately to be close to or reach a target remaining amount. In an embodiment, the remaining amount of the liquid L in the test tube 10 could be controlled within an error range of the microliter level, for example, ±1 μl, but it could also be larger or even smaller. In addition, the pipe diameter d1 of the first tip 20 could be determined according to the amount of each suction of the first tip 20, and the pipe diameter d2 of the second tip 30 could be determined according to the amount of each suction of the second tip 30.

In the embodiment of the present invention, the pipe diameter d1 of the first tip 20 and/or the diameter d2 of the second tip 30 are not limited. For example, the pipe diameter d1 of the first tip 20 is in a range of 2 to 7 times of the pipe diameter d2 of the second tip 30. For another example, the amount of each suction of the first tip 20 is in a range of 350 times to 625 times of the amount of each suction of the second tip 30. In an embodiment, the pipe diameter d1 of the first tip 20 is, for example, between 10 mm and 15 mm or between 11.6 mm and 12.3 mm. The amount of each suction of the first tip 20 could range 4 milliliters (ml) and 5 milliliters. The pipe diameter d2 of the second tip 30 is, for example, between 2 mm and 5 mm or between 2.5 mm and 2.7 mm, and the suction amount of the second tip 30 could be between 8 microliters (μl) and 12 μl. In addition, the length L1 (shown in FIG. 2I) of the first tip 20 and the length L2 (shown in FIG. 2J) of the second tip 30 could be the same or different.

One of the technical effects of replacing the tip is that: in the case of the liquid amount control device 100 applied in the field of precision automated dispensing, the first tip 20 and the second tip 30 are, for example, a dispensing tool. If the liquid L (for example, adhesive) at the first suction end 20d of the first tip 20 is found to be solidified, the first tip 20 could be replaced with the second tip 30 to avoid affecting the suction for the liquid L in the test tube 10.

Figure 2K:
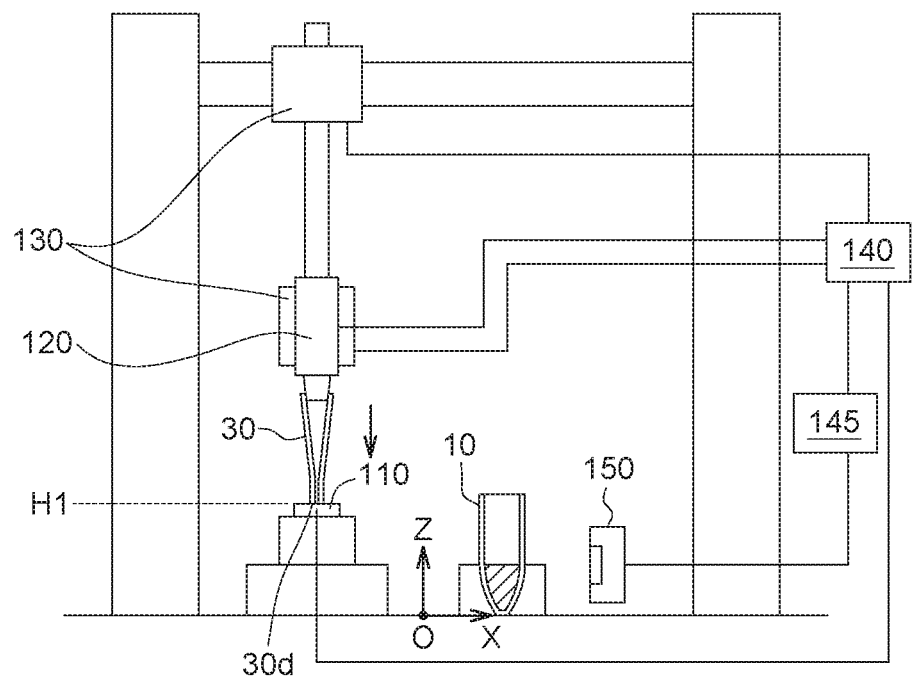

In step S145, as shown in FIG. 2K, after the first tip 20 is replaced by the second tip 30, the controller 140 controls the driver 130 to drive the second suction end 30d of the second tip 30 to enter the detection region of the position detector 110 to obtain the end height position H1 of the second suction end 30d.

The height position H2' (shown in FIG. 2J) of the second suction end 30d after the second tip 30 is installed may be different from the height position H1' (shown in FIG. 2A) of the first suction end 20d after the first tip 20 is installed. But even so, by the second suction end 30d of the second tip 30 touching the position detector 110, the controller 140 could obtain (or define) the end height position H1 of the second suction end 30d of the second tip 30 touching the position detector 110, and thus control the second suction end 30d to move to a desired position. In addition, the installed height position H2' and the installed height position H1' are described as heights with respect to using the origin O.

Figure 2L:
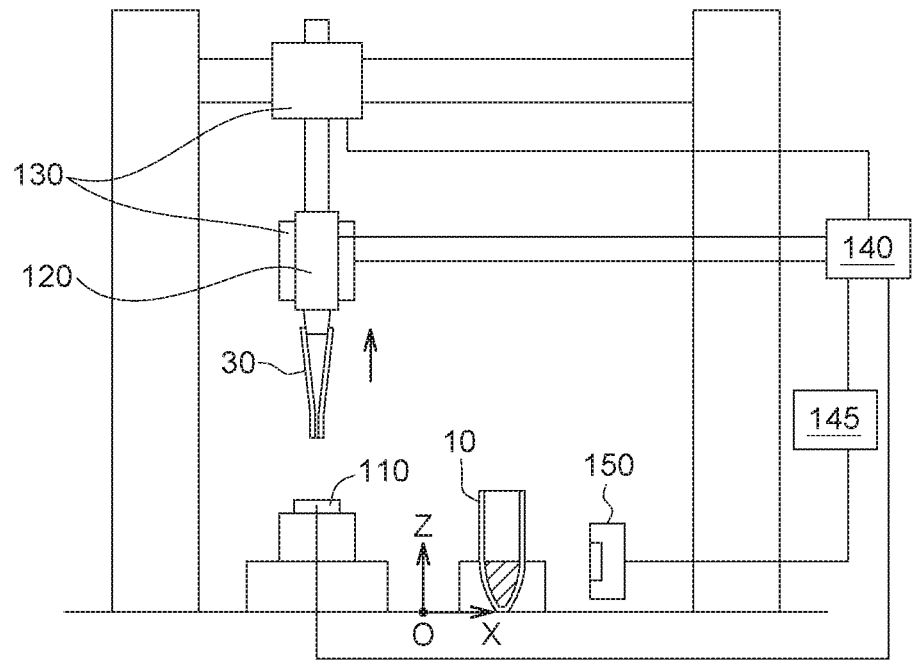

Then, as shown in FIG. 2L, the controller 140 controls the driver 130 to drive the second tip 30 to move in the +Z direction to leave the position detector 110.

Figure 2M:
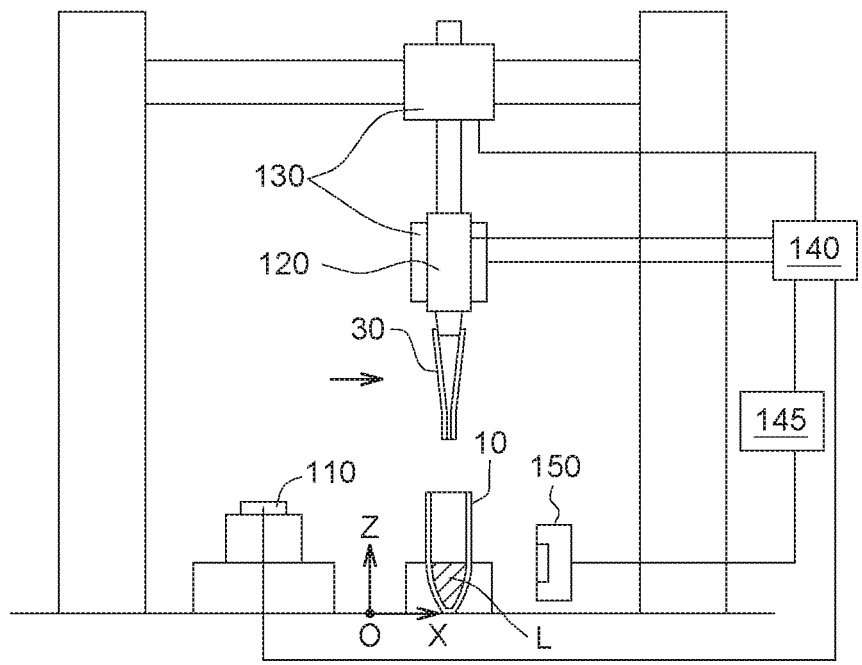

Then, as shown in FIG. 2M, the controller 140 controls the driver 130 to drive the second tip 30 to move to right above the test tube 10 in +X direction.

Figure 2N:
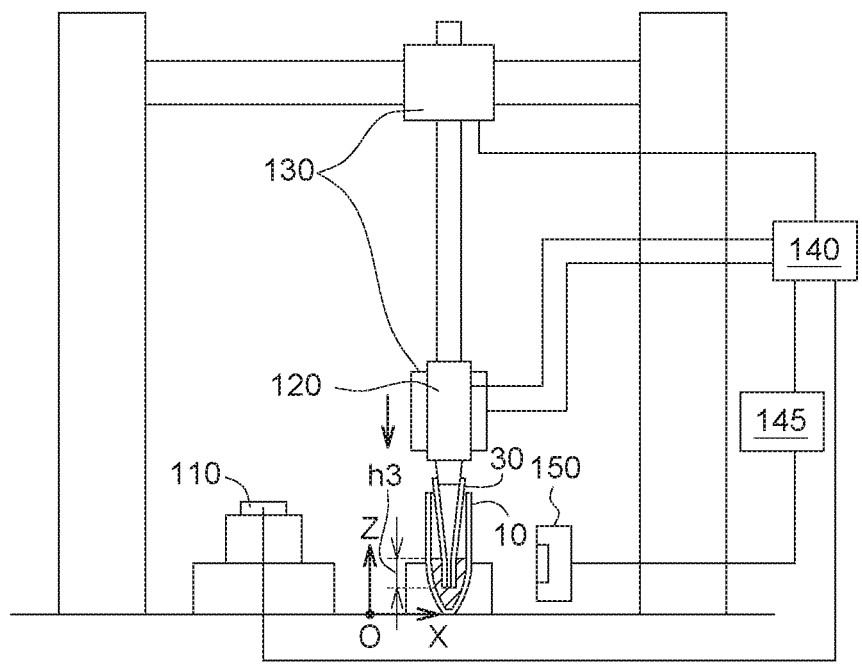
Figure 20:
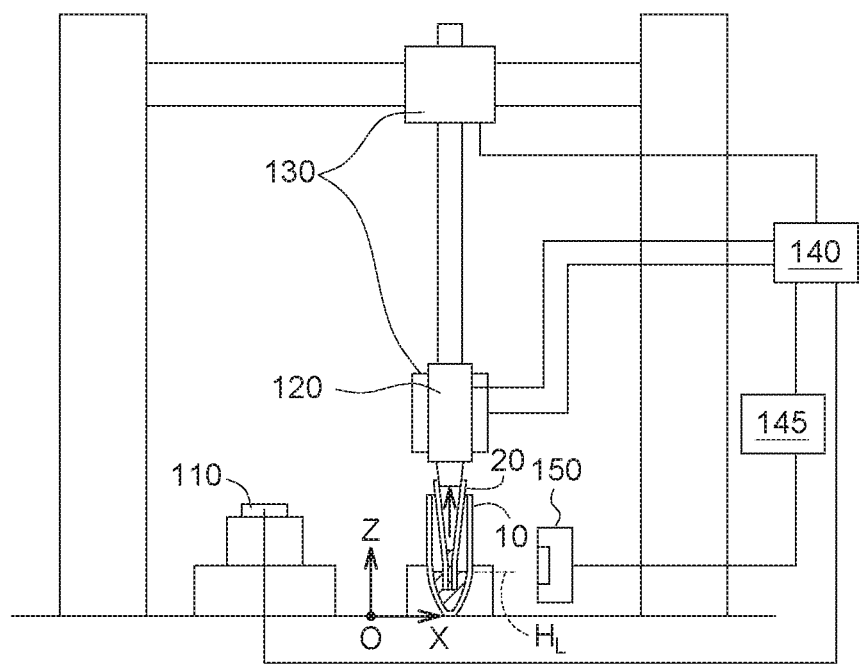

In step S155, as shown in FIG. 2N, the controller 140 controls the driver 130 to drive the second tip 30 to enter the liquid L in the test tube 10 by a third entering depth h3 according to the height position H1. The third entering depth h3 is, for example, a depth extending downward from the liquid level height position $H_L$ (the liquid level of the liquid L). In an embodiment, the controller 140 could calculate the third entering depth h3 according to the preset suction amount of the second tip 30 each time, or the third entering depth h3 itself is a preset value, for example, the minimum suction amount of the second tip 30. In the present embodiment, the third entering depth h3 is, for example, smaller than the first entering depth h1, so as to achieve precise control of micro-suction.

In step S160, as shown in FIG. 2O, the controller 140 controls the pump 120 to suck up the liquid L in the test tube 10 through the second tip 30.

In step S165, the controller 140 controls the driver 130 to drive the second tip 30 away from the liquid L first. Then, the camera 150 captures the image M1 of the liquid L in the test tube 10.

In step S170, the image processor 145 analyzes the image M1 to determine the liquid level height position $H_L$ of the liquid L.

In step S175, the image processor 145 obtains the remaining amount of the liquid L in the test tube 10 according to the liquid level height position $H_L$. For example, the image processor 145 obtains the remaining amount of the liquid L corresponding to the current liquid level height position $H_L$ according to a relative relationship between the remaining amount and the liquid level height position (for example, an equation or a table) and a mathematical method (for example, interpolation).

In step S180, the image processor 145 determines whether the remaining amount of the liquid L in the test tube 10 reaches a target preset amount. The target preset amount is, for example, between 5 microliters and 15 microliters. If yes, the process proceeds to step S181; if not, the process proceeds to step S182.

In step S181, since the remaining amount of the liquid L in the test tube 10 has not reached the target preset amount, the controller 140 controls the driver 130 to drive the second tip 30 to continuously enter the liquid L by a third entering depth h3, and control the pump 120 to continuously suck up the liquid L in the test tube 10, and then the process returns to step S165. Through the image analysis technology, whether the remaining amount of the liquid L in the test tube 10 reaches the target preset amount continue to be determine. In step S182, since the remaining amount of the liquid L in the test tube 10 has reached the target preset amount, the controller 140 controls the pump 120 to stop sucking up the liquid L in the test tube 10, and controls the driver 130 to drive the second tip 30 to leave the liquid. L.

By repeating steps S165 to S181, the second tip 30 could repeatedly enter the liquid L for several times and repeatedly suck up the liquid L for several times. However, depending on the amount of the liquid L in the test tube 10 and the third entering depth h3, the second tip 30 could also enter the liquid L once and suck up the liquid L once.

After step S182, the remaining amount of the liquid L (target preset amount) in the test tube 10 could be used as an appropriate application, such as a medical injection solution, dispensing by a dispensing device or any other required specific volume. In addition, the liquid amount control device 100 further includes a wireless communication module (not shown). The wireless communication module could transmit a signal representing the remaining amount of the liquid L in the test tube 10 to an electronic device (not shown). The electronic device is, for example, a display device, a mobile device, smart a speaker, a wearable device, and/or a computer.

The liquid amount control device 100 according to the embodiment of the present invention could control the remaining amount of the liquid L in the test tube 10 to a microliter-level error, for example, 1 μl, but could be larger or even smaller. Referring to Tables 1 and 2 below. Table 1 plots the experimental results of liquid amount control using a conventional liquid amount control device, and Table 2 plots the experimental results of liquid amount control using the liquid amount control device 100 according to the embodiment of the present invention.

As shown in Table 1, for the target preset amount of 16 microliters, the minimum remaining amount of the conventional liquid amount control device is as low as 6.1 microliters, wherein the minimum remaining amount is 9.9 microliters less than the target preset amount, and the error is 62%. As shown in Table 2, for the target preset amount of 16 microliters, the maximum remaining amount of the liquid amount control device 100 is 18.2 microliters, wherein the maximum remaining amount is 2.2 microliters higher than the target preset amount, and the error is 14%. Comparing Tables 1 and 2, it is clear that the liquid amount control device 100 according to the embodiment of the present invention could make the remaining amount of the liquid L in the test tube 10 closer to the target preset amount.

TABLE 1

| Experiment serial number | The remaining amount of liquid L in the test tube 10 (microliter) |
|---|---|
| 1 | 12.6 |
| 2 | 12 |

TABLE 1-continued

| Experiment serial number | The remaining amount of liquid L in the test tube 10 (microliter) |
|---|---|
| 3 | 13.5 |
| 4 | 11.1 |
| 5 | 10.5 |
| 6 | 13.8 |
| 7 | 13.1 |
| 8 | 16.1 |
| 9 | 6.1 |
| 10 | 10.7 |
| target preset amount (microliter) | 16 ± 10% |
| average value (microliter) | 11.95 |
| the maximum remaining amount (microliter) | 16.1 |
| the minimum remaining amount (microliter) | 6.1 |

TABLE 2

| Experiment serial number | The remaining amount of liquid L in the test tube 10 (microliter) |
|---|---|
| 1 | 17.7 |
| 2 | 17.8 |
| 3 | 15.6 |
| 4 | 17.2 |
| 5 | 17.6 |
| 6 | 18.2 |
| 7 | 17.3 |
| 8 | 16.1 |
| 9 | 17.6 |
| 10 | 17.8 |
| target preset amount (microliter) | 16 ± 10% |
| average value (microliter) | 17.29 |
| the maximum remaining amount (microliter) | 18.2 |
| the minimum remaining amount (microliter) | 15.6 |

Referring to Table 3 below. Table 3 plots the experimental results of the liquid amount control using the liquid amount control device 100 of the embodiment of the present invention. For the target preset amount of 9 microliters, the minimum remaining amount of the conventional liquid amount control device 100 is 8.3 microliters, wherein the minimum remaining amount is 0.7 microliters less than the target preset amount, and the error is only 8%. The liquid amount control device 100 of the present embodiment could make the remaining amount of the liquid L in the test tube 10 substantially Close to the target preset amount.

TABLE 3

| Experiment serial number | The remaining amount of liquid L in the test tube 10 (microliter) |
|---|---|
| 1 | 8.4 |
| 2 | 8.7 |
| 3 | 8.3 |
| 4 | 9.5 |
| 5 | 8.4 |
| 6 | 8.7 |
| 7 | 8.7 |
| 8 | 8.5 |
| 9 | 8.6 |
| 10 | 9.2 |
| target preset amount (microliter) | 9 ± 10% |
| average value (microliter) | 8.7 |
| the maximum remaining amount (microliter) | 9.5 |
| the minimum remaining amount (microliter) | 8.3 |

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid amount control device for controlling liquid amount of liquid in a test tube, and the liquid amount control device comprises:
    a position detector;
    a pump connected with a first tip and configured to suck up the liquid out of the test tube;
    a driver connected with the pump and configured to drive the pump to move;
    a controller, electrically connected to the position detector, the driver and the pump, and the controller is configured to:
        control the driver to drive a first suction end of the first tip to enter a detection region of the position detector to obtain an end height position of the first suction end;
        control the driver to drive the first suction end of the first tip to enter the liquid by a first entering depth according to the end height position; and
        control the pump to suck up the liquid in the test tube through the first tip.

2. The liquid amount control device according to claim 1, further comprises:
    a camera configured to capture an image of the liquid in the test tube;
    wherein the liquid amount control device further comprises an image processor, the image processor is configured to:
    analyze the image to determine a liquid level height position of the liquid;
    obtain a remaining amount of the liquid according to the liquid level height position;
    determine whether the remaining amount reaches a target preset amount;
    wherein the controller is further configured to:
    when the remaining amount reaches the target preset amount, control the pump to stop sucking up the liquid in the test tube; and
    when the remaining amount does not reach the target preset amount, control the pump to continue to suck up the liquid in the test tube.

3. The liquid amount control device according to claim 1, wherein the position detector is a limit switch.

4. The liquid amount control device according to claim 1, further comprises:
    a camera configured to capture an image of the liquid in the test tube; and
    an image processor configured to:
    analyze the image to determine a liquid level height position of the liquid;

wherein the first entering depth is calculated from the liquid level height position.

5. The liquid amount control device according to claim 4, wherein the controller is further configured to:
before the liquid level height position of the liquid in the test tube is lower than an end height position of the first suction end, control the driver to drive the first suction end of the first tip to enter the liquid by a second entering depth.

6. The liquid amount control device according to claim 5, wherein in step of controlling the driver to drive the first suction end of the first tip to enter the liquid by the first entering depth, range of the first entering depth ranges between an upper limit position and a lower limit position, the upper limit position is a photographable area of the camera, and range of the second entering depth does not exceed the lower limit position.

7. The liquid amount control device according to claim 1, wherein the controller is further configured to:
before a liquid level height position of the liquid in the test tube is lower than an end height position of the first suction end, control the driver to drive the first suction end of the first tip to enter the liquid by a second entering depth; and
control the pump to suck up the liquid in the test tube through the first tip.

8. The liquid amount control device according to claim 7, wherein the second entering depth is the same as the first entering depth.

9. The liquid amount control device according to claim 1, wherein the controller is further configured to:
when a remaining amount of the liquid in the test tube is less than an intermediate preset amount, control the driver to drive the first tip away from the test tube;
after the first tip is replaced with a second tip, control the driver to drive a second suction end of the second tip to enter the detection region of the position detector to obtain an end height position of the second suction end, wherein an diameter of the second tip is smaller than an diameter of the first tip;
according to the end height position, control the driver to drive the second suction end of the second tip to enter the liquid by a third entering depth; and
control the pump to suck up the liquid in the test tube through the second tip.

10. The liquid amount control device according to claim 9, further the third entering depth is less than the first entering depth.

11. A liquid amount control method for controlling liquid amount of liquid in a test tube, and the liquid amount control method comprises:
providing the liquid amount control device as claimed in claim 1;
controlling, by the controller, the driver to drive the first suction end of the first tip to enter the detection region of the position detector to obtain an end height position of the first suction end;
controlling, by the controller, the driver to drive the first suction end of the first tip to enter the liquid by the first entering depth according to the end height position; and
controlling, by the controller, the pump to suck up the liquid in the test tube through the first tip.

12. The liquid amount control method according to claim 11, wherein the position detector is a limit switch.

13. The liquid amount control method according to claim 11, wherein the liquid amount control device further comprises a camera, and step of entering the liquid by the first entering depth further comprises:
capturing, by the camera, an image of the liquid in the test tube; and
wherein the liquid amount control method further comprises:
analyzing, by an image processor, the image to determine a liquid level height position of the liquid;
wherein the first entering depth is calculated from the liquid level height position.

14. The liquid amount control method according to claim 13, further comprises:
before the liquid level height position of the liquid in the test tube is lower than an end height position of the first suction end, controlling the driver to drive the first suction end of the first tip to enter the liquid by a second entering depth.

15. The liquid amount control method according to claim 14, wherein in step of controlling the driver to drive the first suction end of the first tip to enter the liquid by the first entering depth, the first entering depth ranges between an upper limit position and a lower limit position, the upper limit position is a photographable area of the camera, and the second entering depth does not exceed the lower limit position.

16. The liquid amount control method according to claim 11, further comprises:
before a liquid level height position of the liquid in the test tube is lower than an end height position of the first suction end, controlling the driver to drive the first suction end of the first tip to enter the liquid by a second entering depth; and
controlling, by the controller, the pump to suck up the liquid in the test tube through the first tip.

17. The liquid amount control method according to claim 16, wherein in step of controlling the driver to drive the first suction end of the first tip to enter the liquid by the second entering depth, the second entering depth is the same as the first entering depth.

18. The liquid amount control method according to claim 11, further comprises:
when a remaining amount of the liquid in the test tube is less than an intermediate preset amount, controlling the driver to drive the first tip away from the test tube;
after the first tip is replaced with a second tip, controlling the driver to drive a second suction end of the second tip to enter the detection region of the position detector to obtain an end height position of the second suction end, wherein an diameter of the second tip is smaller than an diameter of the first tip;
according to the end height position, controlling the driver to drive the second suction end of the second tip to enter the liquid by a third entering depth; and
controlling the pump to suck up the liquid in the test tube through the second tip.

19. The liquid amount control method according to claim 18, further the third entering depth is less than the first entering depth.

20. The liquid amount control method according to claim 18, wherein the liquid amount control device further comprises a camera and an image processor, and the liquid amount control method further comprises:
capturing, by the camera, an image of the liquid in the test tube;
analyzing, by the image processor, the image to determine a liquid level height position of the liquid;

obtaining, by the image processor, a remaining amount of the liquid according to the liquid level height position;

determining, by the controller, whether the remaining amount reaches a target preset amount;

when the remaining amount reaches the target preset amount, controlling the pump to stop sucking up the liquid in the test tube; and when the remaining amount does not reach the target preset amount, controlling the pump to continue to suck up the liquid in the test tube.

\* \* \* \* \*